(12) United States Patent
Nakamura et al.

(10) Patent No.: US 10,044,720 B2
(45) Date of Patent: Aug. 7, 2018

(54) MASHUP METHOD, COMPUTER-READABLE RECORDING MEDIUM, AND TERMINAL

(71) Applicant: FUJITSU LIMITED, Kawasaki-shi, Kanagawa (JP)

(72) Inventors: Yosuke Nakamura, Kawasaki (JP); Junya Kani, Kawasaki (JP); Takuya Sakamoto, Kawasaki (JP); Koichi Yasaki, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/070,467

(22) Filed: Mar. 15, 2016

(65) Prior Publication Data
US 2016/0285880 A1   Sep. 29, 2016

(30) Foreign Application Priority Data
Mar. 27, 2015   (JP) ................. 2015-067621

(51) Int. Cl.
*H04L 29/06* (2006.01)
*G06F 21/62* (2013.01)
(Continued)

(52) U.S. Cl.
CPC ........ *H04L 63/101* (2013.01); *G06F 21/6236* (2013.01); *G06F 21/128* (2013.01); *G06F 21/606* (2013.01)

(58) Field of Classification Search
CPC .................................................. H04L 63/101
See application file for complete search history.

(56) References Cited

U.S. PATENT DOCUMENTS

| 8,272,065 B2 * | 9/2012 | Persson ................. G06F 21/629 |
| | | 715/234 |
| 9,369,433 B1 * | 6/2016 | Paul .................... H04L 63/0227 |

(Continued)

FOREIGN PATENT DOCUMENTS

| JP | 2013-041408 | 2/2013 |
| JP | 2013-190971 | 9/2013 |

(Continued)

OTHER PUBLICATIONS

Robert Kleinfeld et al: "glue.things—a Mashup Platform for wiring the Internet of Things with the Internet of Services", Web of Things, ACM, 2 Penn Plaza, Suite 701 New York NY 10121-0701 USA, Oct. 8, 2014 (Oct. 8, 2014), pp. 16-21, XP058067890, DOI: 10.1145/2684432.2684436, ISBN: 978-1-4503-3066-4 *Sections 2, 3.1.1, 3.1.2, 4.1, 3.2(i)-(ii)*.

(Continued)

*Primary Examiner* — Simon P Kanaan
(74) *Attorney, Agent, or Firm* — Fujitsu Patent Center

(57) ABSTRACT

A mashup method is disclosed. The Web APIs which the Web application uses are specified by analyzing descriptions of drivers used to access the multiple Web APIs from a Web application to external devices. A Web Application Programming Interface list is created to indicate the Web APIs. The Web application is analyzed. The external devices including the Web APIs which the Web application accesses are estimated. An external device list which indicates the estimated external devices is created. By referring to the external device list, when one or more external devices do not exist, an access to each of the Web APIs pertinent to the Web application is restricted where the one or more external devices include the Web APIs used in a process of the Web application and the process is realized by mashup.

9 Claims, 18 Drawing Sheets

(51) Int. Cl.
  *G06F 21/12*    (2013.01)
  *G06F 21/60*    (2013.01)

(56) References Cited

U.S. PATENT DOCUMENTS

| | | |
|---|---|---|
| 2007/0100790 A1 | 5/2007 | Cheyer et al. |
| 2011/0321131 A1* | 12/2011 | Austel ............... G06F 21/33 726/4 |
| 2013/0047216 A1 | 2/2013 | Ajitomi et al. |
| 2013/0191880 A1* | 7/2013 | Conlan ............... H04L 63/20 726/1 |
| 2014/0073321 A1 | 3/2014 | Kuusilinna et al. |
| 2016/0057107 A1* | 2/2016 | Call ............... H04L 63/02 726/11 |

FOREIGN PATENT DOCUMENTS

| | | |
|---|---|---|
| JP | 2014-222517 | 11/2014 |
| WO | 2011/088053 | 7/2011 |

OTHER PUBLICATIONS

Christian Fuhrhop et al: "The webinos Project", Proceedings of the 21st International Conference Companion on World Wide Web, WWW '12 Companion, Apr. 16, 2012 (Apr. 16, 2012), pp. 259, XP055189344, New York, New york, USA, DOI: 10.1145/2187980. 2188024, ISBN: 978-1-45-031230-1.
EESR—The Extended European Search Report dated May 4, 2016 issued with respect to the corresponding European Patent Application No. 16157711.9.

* cited by examiner

FIG.8

| DEVICE NAME | WEB API |
|---|---|
| printer | a4Print |
| printer | b4Print |
| cardreader | readICCard |
| cardreader | writeICCard |
| display | showDisplay |

| DEVICE NAME | URL |
|---|---|
| printer | http://xxx.jp/a4print |
| printer | http://xxx.jp/b4print |
| cardreader | http://yyy.jp/read_ic |
| cardreader | http://yyy.jp/write_ic |
| display | http://zzz.jp/show_disp |

```
function authPrint(){     152
  var auth1 = readICCard();
  var auth2 = OpenTextFile(auth.txt);
  if(auth1 == auth2){
    a4Print();
          153
  }
}
```
151

FIG.10B

```
function readCard(var auth){
  auth = readICCard();
              163
}
function authPrint(){
  var auth1;    162
  readCard(auth1);
  var auth2 = OpenTextFile(auth.txt);
  if(auth1 == auth2){
    a4Print();
          164
  }
}
```
161

FIG.11

```
function checkCharge(){
 var charge = readICCard();
 if(charge != null){
   var xhr= new XMLHttpRequest();
   xhr.open("GET","http://zzz.jp/show_disp");
   xhr.send();
   xhr.addEventListener("load",function(e){
 });
 }
}
```

FIG.12

| APPLICATION NAME | DEVICE NAME 1 | DEVICE NAME 2 | ... |
|---|---|---|---|
| authPrint | printer | cardreader | |
| checkCharge | cardreader | display | |

| DEVICE NAME |
|---|
| cardreader |
| display |

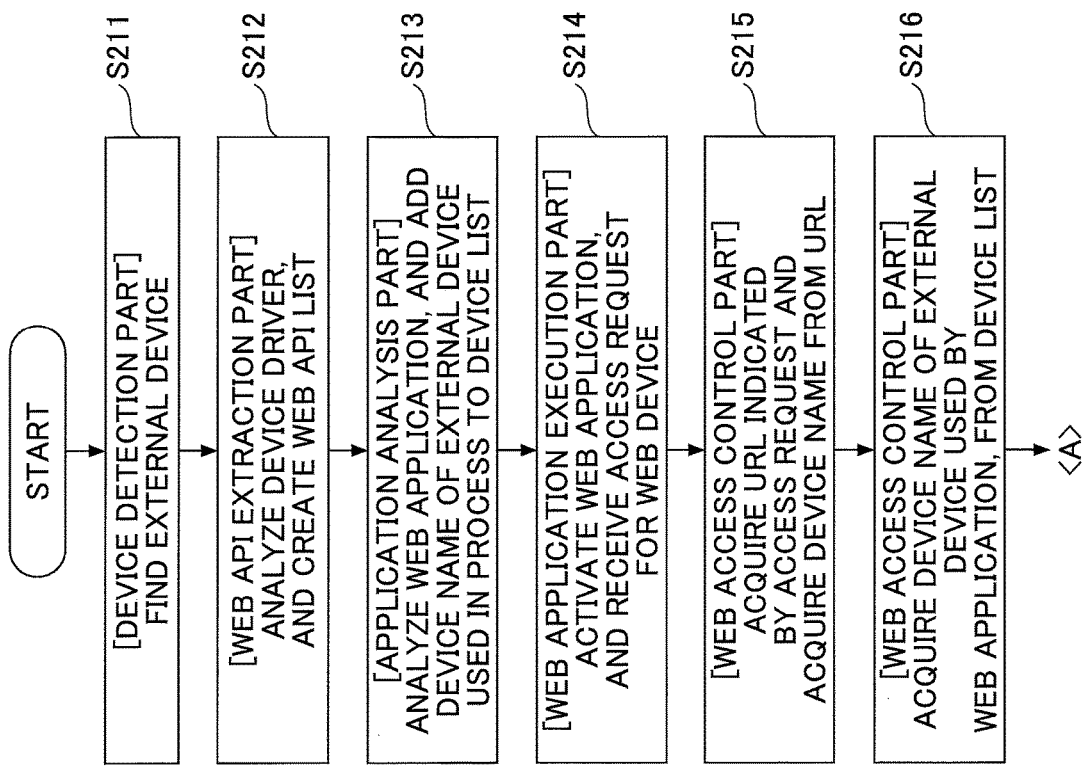

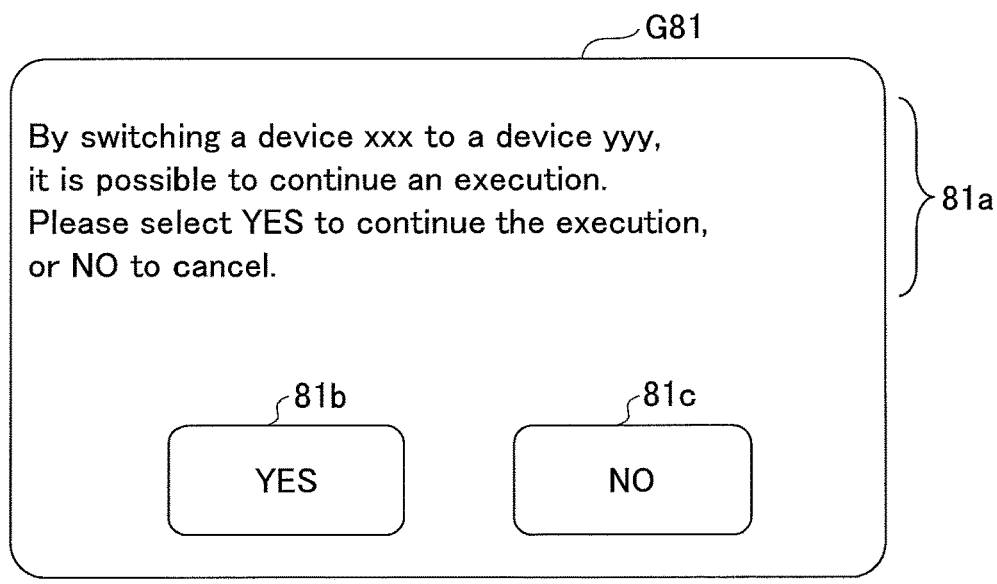
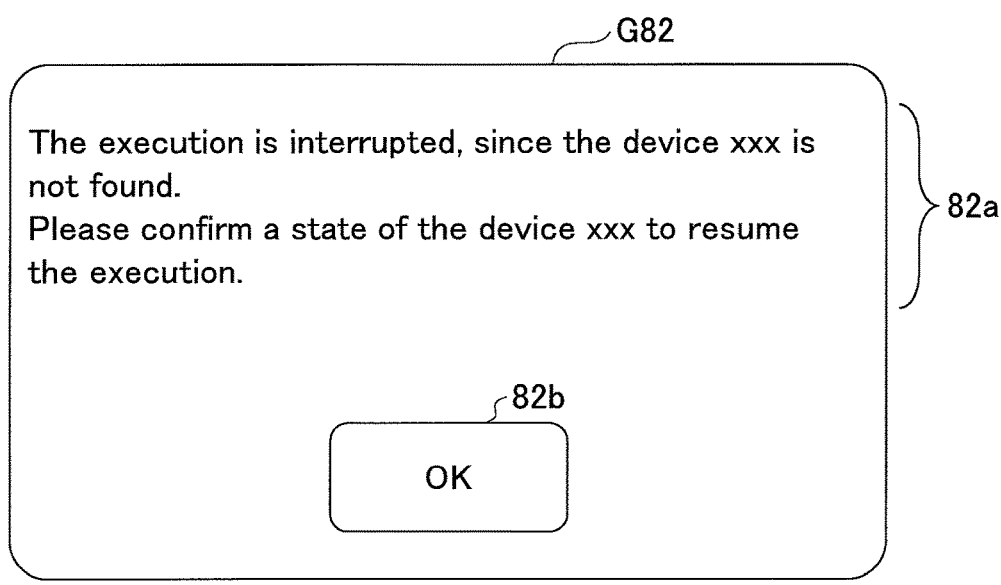

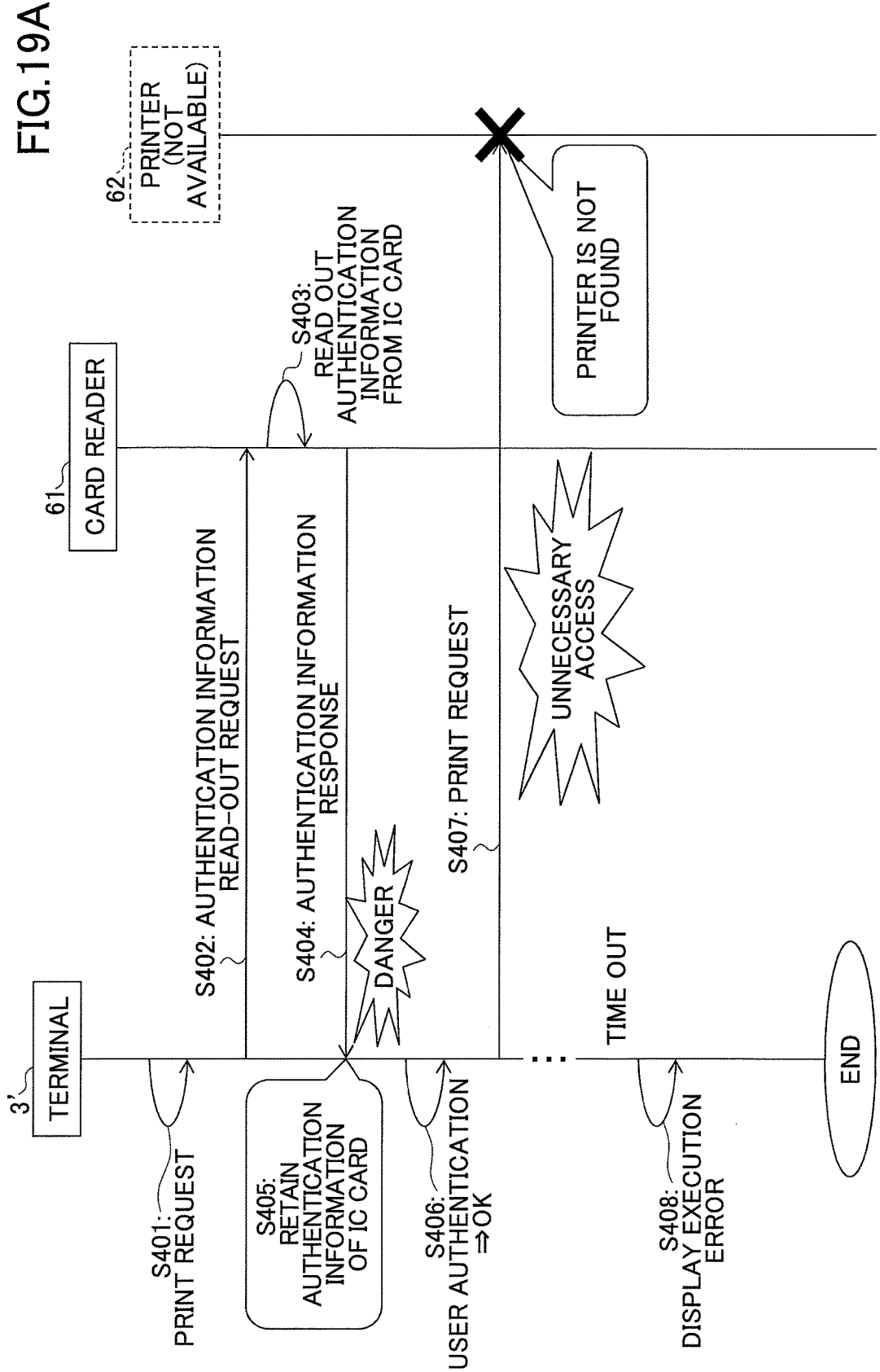

MASHUP METHOD, COMPUTER-READABLE RECORDING MEDIUM, AND TERMINAL

CROSS-REFERENCE TO RELATED APPLICATIONS

This application is based upon and claims the benefit of priority of the prior Japanese Priority Application No. 2015-067621 filed on Mar. 27, 2015, the entire contents of which are hereby incorporated by reference.

FIELD

The embodiment discussed herein is related to a mashup technology.

BACKGROUND

Recently, a mashed-up service has been provided by combining, via the Internet, multiple Web services which have been opened in a Web.

Regarding authentication with respect to such mashup service, in an information processing system constructed by combining multiple system environments, a technology is known to determine whether a user is authorized to access a channel by referring to a channel management table that maintains permission to access or denial to access contents of the channel which the user attempts to access.

Also, other technologies are published to obtain a user permission, regarding use of a resource of a cooperation service with a Web service and a home device, and to make a resource use request embedded in JavaScript (registered trademark) embedded in a HyperText Markup Language (HTML).

Patent Documents

Japanese Laid-open Patent Publication No. 2013-190971
Japanese Laid-open Patent Publication No. 2013-41408
Japanese Laid-open Patent Publication No. 2014-222517

Various authentication methods become available with respect to mashup Web services due to the above described technologies. In a case in which authentication information acquired from an external device is read into a Web application for conducting a Web service, there is no measure to secure the authentication read into the Web application.

If attempting to use another external device by mashup and the external device is unavailable to access, the Web service will not be normally performed. However, it has been a concern that the authentication information read into the Web application is unnecessarily transmitted to a cloud computer and another external device being accessible.

SUMMARY

According to one aspect of an embodiment, there is provided a mashup method for realizing a process function by accessing multiple Web Application Programming Interfaces, including: specifying, by a computer, the Web Application Programing Interfaces which a Web application uses, by analyzing descriptions of drivers used to access the multiple Web Application Programing Interfaces from the Web application to external devices; creating and storing, by the computer, a Web Application Programing Interface list which indicates the specified Web Application Programing Interfaces in a storage part; analyzing, by the computer, the Web application and estimating the external devices including the Web Application Programing Interfaces which the Web application accesses; creating and storing, by the computer, an external device list which indicates the estimated external devices in the storage part; and restricting, by the computer, an access to each of the Web Application Programing Interfaces pertinent to the Web application by referring to the external device list, when one or more external devices do not exist, the one or more external devices including the Web Application Programing Interfaces used in a process of the Web application, the process realized by mashup.

According to other aspects of the embodiment, a mashup program, a computer-readable recording medium storing the mashup program, and a terminal may be provided.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 8 is a diagram illustrating a data example of a first Web API list;

FIG. 9 is a diagram illustrating a data example of a second Web API list;

FIG. 10A and FIG. 10B are diagrams for explaining an application analysis process with respect to an authentication printing application;

FIG. 11 is a diagram for explaining the application analysis process with respect to a balance confirmation application;

FIG. 12 is a diagram illustrating a data example of a device list;

FIG. 13 is a diagram illustrating a data example of a detection device list;

FIG. 15A and FIG. 15B are diagrams for explaining the entire access control process;

FIG. 17 is a diagram illustrating an example of a confirmation screen;

FIG. 18 is a diagram illustrating an example of the notification screen; and FIG. 19A and FIG. 19B are diagrams for explaining a difference between process sequences between presence and absence of the access control process.

DESCRIPTION OF EMBODIMENTS

In the following, embodiments of the present invention will be described with reference to the accompanying drawings. A mashup service is regarded as a new service realized by combining multiple services. First, an example of a network configuration for providing a Web service by mashup will be described.

Figure 1:
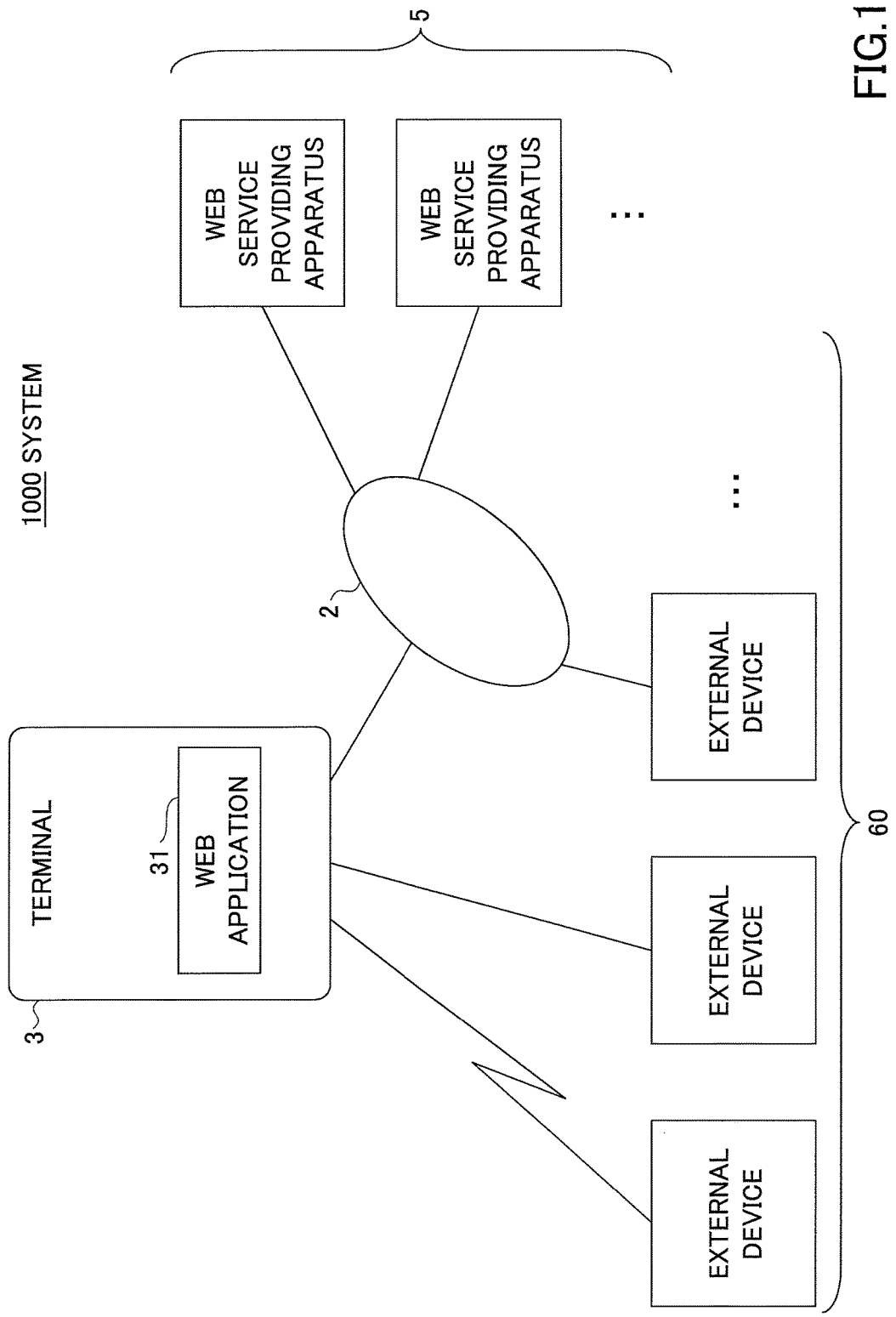
FIG. 1 is a diagram illustrating a network configuration example of a system for providing a Web service.

FIG. 1 is a diagram illustrating a network configuration example of a system for providing the Web service. A system 1000 in the network configuration example includes a terminal 3 including a Web application 31, one or more Web service providing apparatuses 5, and one or more external devices 60. The terminal 3 and the Web service providing apparatuses 5 are connected through a network 2 such as the Internet.

The terminal 3 and the external devices 60 are connected by short distance radio communication such as Bluetooth LE (registered trademark), Wi-Fi, or the like, or by a Universal Serial Bus (USB). The terminal 3 corresponds to a terminal which may be possessed by a user such as a cellular phone, a wearable terminal, a tablet terminal, or the like. Each of the external devices 60 may be a device being detected by a device detection function of the terminal 3.

Each of the Web service providing apparatuses 5 provides the terminal 3 a Web service being mashed up by using information acquired from the external devices 60 through the terminal 3, information acquired from the external device 60 through the network 2, in response to a Web service request sent from the terminal 3. Hereinafter, the Web service being mashed up may be called "mashup Web service".

By each of the Web service providing apparatuses 5, the Web service such as Google APIs or the like is provided. Also, Internet of Things (IoT) and Web of Things (WoT) may be realized. In the Internet of Things (IoT), multiple external devices are connected to the Internet. In the Web of Things (WoT), each of the external devices connected to the Internet are accessed by Hypertext Transfer Protocol (HTTP). The HTTP includes a Web Application Programming Interface (API) opened by each of the external devices connected to the Internet. Since the external devices having the Web APIs are connected to the network 2, functions of the external devices 60 become mashup subjects.

In devices having specific functions regardless of presence or absence of a network communication function, one or more devices, which provide data acquired by at least one of the specific functions by a network communication, correspond to the external devices 60. Card readers for reading data from various types of cards such as a magnetic card, an IC card, a memory card, and the like, image forming apparatuses such as a copier, a facsimile, a printer, and the like, and measuring equipment such as a rain gauge, an anemometer, an earthquake recorder, and the like may correspond to the specific functions.

Also, in the embodiment, in a case in which a user authentication is successfully conducted based on the authentication information acquired from one of the external devices 60, a series of a function of one or more other external devices 60, and/or outputting of a result acquired by a data process by a Web application corresponds to the mashup service.

Figure 2:
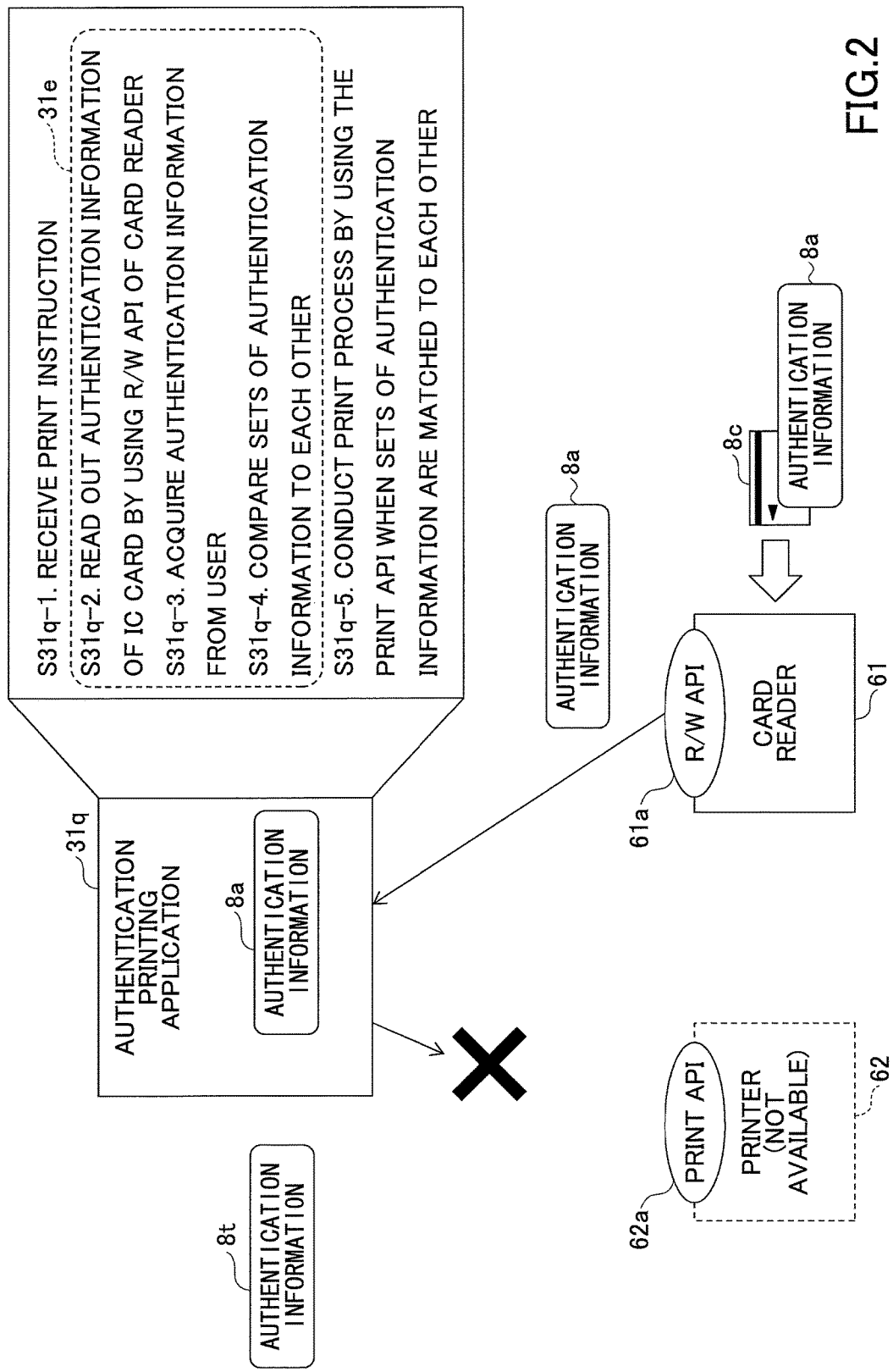
FIG. 2 is a diagram for explaining a case in which user authentication has been failed in a mashup Web service.

A case, in which the user authentication has failed in a series of processes being mashed up, will be described. FIG. 2 is a diagram for explaining the case in which the user authentication has failed in the mashup Web service. In FIG. 2, the case in which the user authentication has been failed is described in an example of a process of an authentication printing application 31$q$.

An authentication printing application 31$q$ may be an application pertinent to the Web service that performs a print process when the user authentication is successful, and may correspond to one example of a Web application 31. A card reader 61 includes a r/w API 61$a$. A printer 62 includes a print API 62$a$. The r/w API 61$a$ and the print API 62$a$ correspond to the Web APIs.

When receiving a print instruction from the user (step S31$q$-1), the authentication printing application 31$q$ reads out authentication information 8$a$ of an IC card 8$c$ by using the r/w API 61$a$ of the card reader 61 (step S31$q$-2). The authentication printing application 31$q$ acquires the authentication information 8$t$ retained in the terminal 3 (step S31$q$-3), compares the authentication information 8$a$ with the authentication information 8$t$ (step S31$q$-4), and performs the print process by using the print API 62$a$ of the printer 62 when the authentication information 8$t$ matches the authentication information 8$a$ (step S31$q$-5).

In this process, the authentication printing application 31$q$ has found that the printer 62 does not exist due to a calling failure of the print API 62$a$. The print process instructed by the user is not performed. However, the authentication process for the print process is generally conducted before step S31$q$-5 in which the print API 62$a$ is called. Thus, the authentication information 8$a$ of the user has been unnecessarily loaded into the authentication printing application 31$q$. That is, unwantedly for the user, the authentication information 8$a$ is read out from the IC card 8$c$.

In the embodiment, it is possible to improve the security of accessing the external devices 60. When one or more of multiple external devices 60 pertinent to the Web application 31 are not available, the access to each of the external devices 60 pertinent to the Web application 31 are suppressed.

That is, in FIG. 2, in the embodiment, when it is determined that it is not possible to access the printer 62, execution of a process 31$e$ from step S31$q$-2 to step S31$q$-4 in the authentication printing application 31$q$ is suppressed. Access control of the Web API in the authentication printing application 31$q$ in FIG. 2 will be briefly described below.

Figure 3:
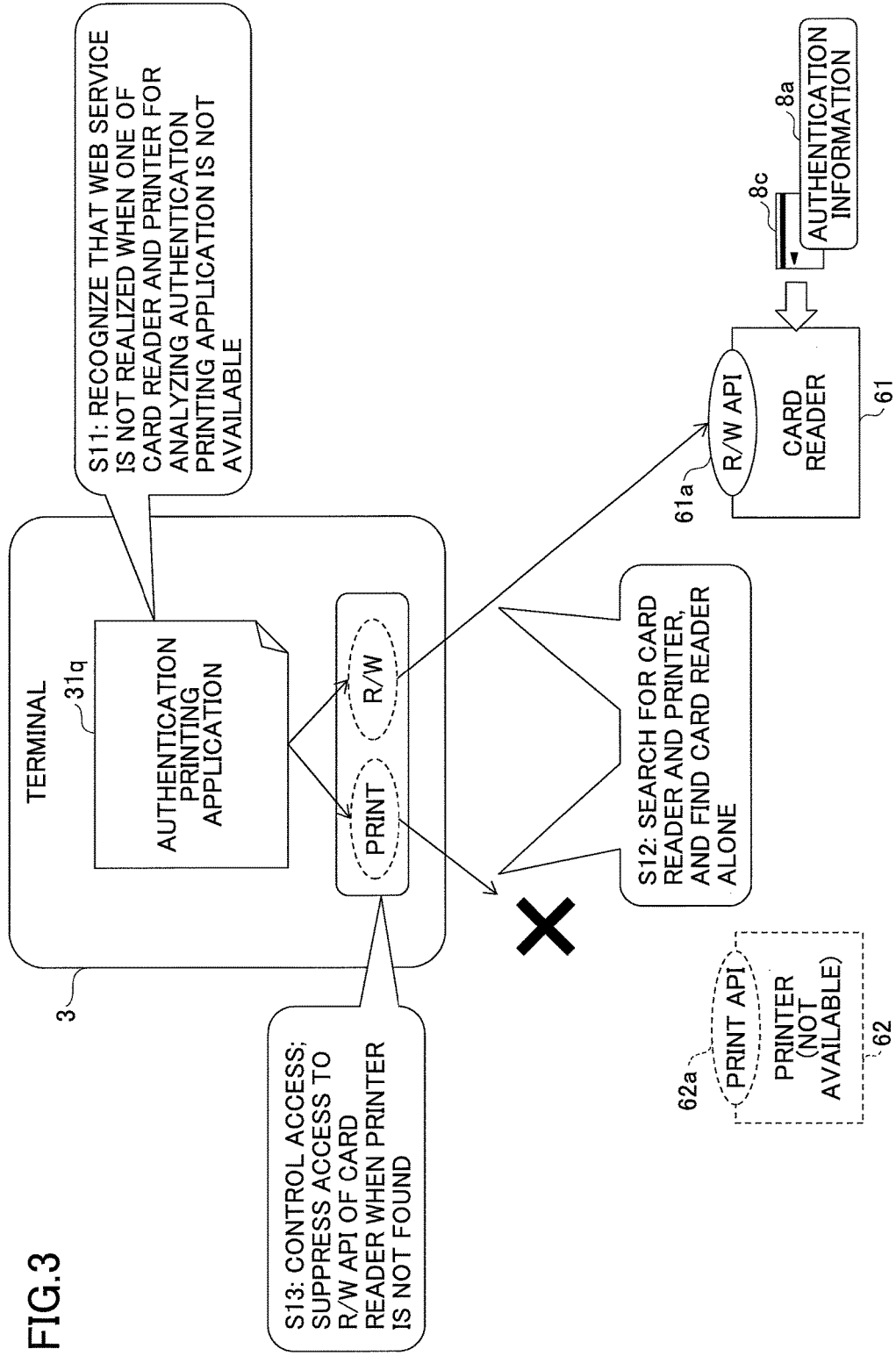
FIG. 3 is a diagram for briefly explaining an access control of the Web API.

FIG. 3 is a diagram for briefly explaining the access control of the Web API in the embodiment. In FIG. 3, when the authentication printing application 31$q$ is performed in the terminal 3 in response to the print instruction from the user, the authentication printing application 31$q$ is analyzed (step S11). By this analysis, it is recognized that the mashup Web service is not realized if one of the card reader 61 and the printer 62 is not available.

Next, based on an analysis result, the card reader 61 and the printer 62 are searched for (step S12). By this search, the card reader 61 is found, but the printer 62 is not found. In this case, the access to the card reader 61 is restricted (step S13). Since the printer 62 is not found, the access to another Web API, that is, the r/w API 61$a$, which the authentication printing application 31$q$ calls, is suppressed.

By this access control, it is possible to prevent the authentication information 8$a$ recorded in the IC card 8$c$ from being unnecessarily read out by the authentication printing application 31$q$.

Figure 4:
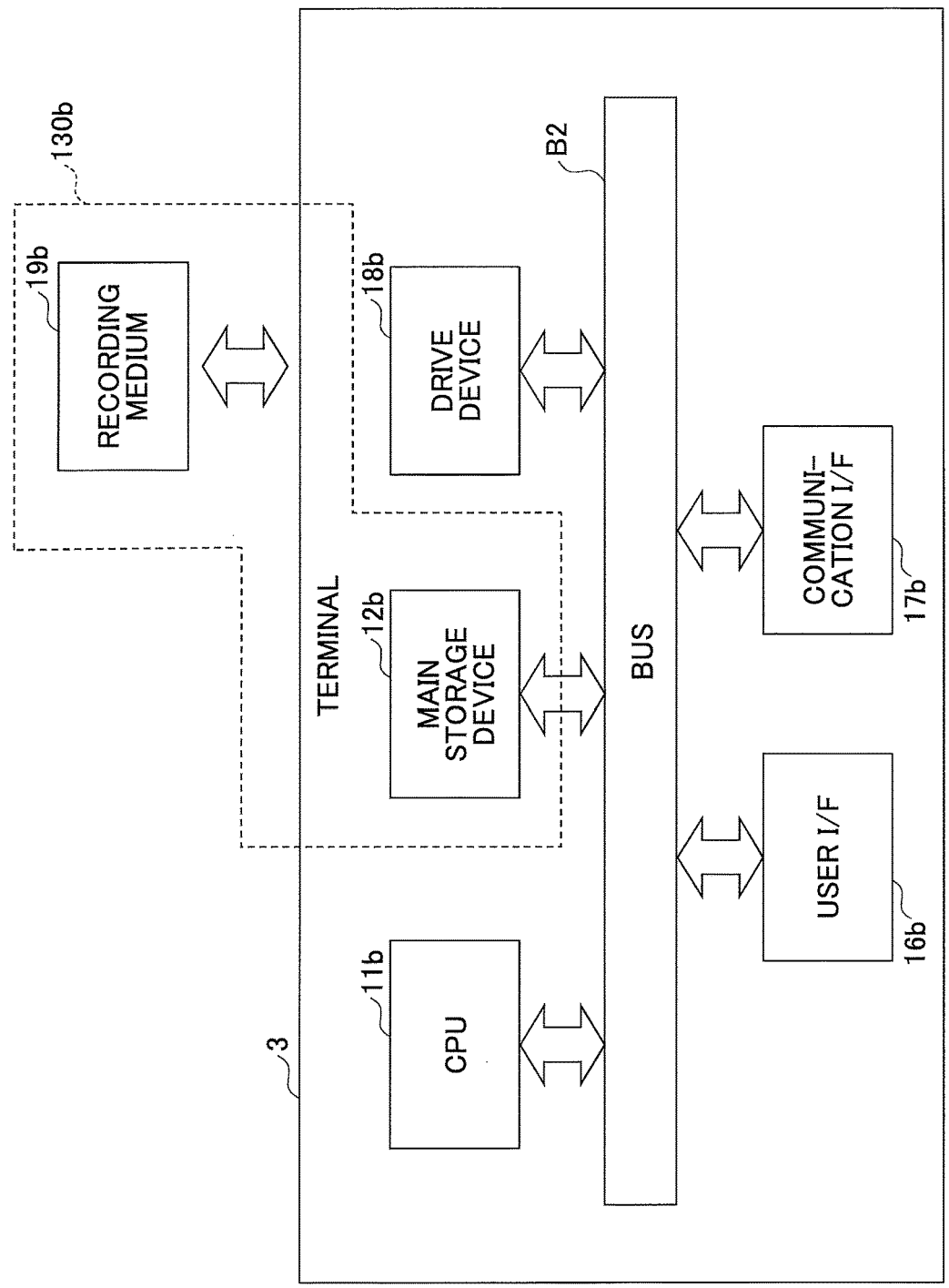
FIG. 4 is a diagram illustrating a hardware configuration of a terminal.

The terminal 3 receiving the Web service by the Web application 31 may include a hardware configuration as illustrated in FIG. 4. FIG. 4 is a diagram illustrating the hardware configuration of the terminal. The terminal 3 is regarded as an information processing terminal such as the tablet terminal, the cellular phone, or the like controlled by a computer, and includes a Central Processing Unit (CPU) 11b, a main storage device 12b, a user InterFace (I/F) 16b, a communication I/F 17b, and a drive device 18b, which are mutually connected via a bus B2.

The CPU 11b controls the terminal 3 as a processor in accordance with a program stored in the main storage device 12b. A Random Access Memory (RAM), a Read Only Memory (RPM), or the like is used as the main storage device 12b. The main storage device 12b stores or temporarily stores the program to be executed by the CPU 11b, data used in a process by the CPU 11b, data acquired in the process by the CPU 11b, and the like. The program stored in the main storage device 12b is executed by the CPU 11b, so that various processes are realized.

The user I/F 16b displays various information items under control of the CPU 11b, and may be a touch panel or the like capable of inputting data by operations of the user. Communications by the communication I/F 17b may not be limited to wireless or wired communications. The communication I/F 17b is an interface that supports various communications such as Bluetooth LE and the Wi-Fi as the radio communications, and the network communication.

The program for realizing processes conducted in the terminal 3 may be downloaded through the network 2. Alternatively, the program may be stored beforehand in the main storage device 12b of the terminal 3.

The drive device 18b interfaces between a recording medium 19b (such as a Secure Digital (SD) memory card, or the like) set into the drive device 18b and the terminal 3. It is noted that the recording medium 19b for storing the program is not limited to the SD memory card. The recording medium 19b may be formed by a non-transitory or tangible computer-readable recording medium including a structure. A storage part 130b corresponds to the main storage device 12b and/or the recording medium 19b.

Figure 5:
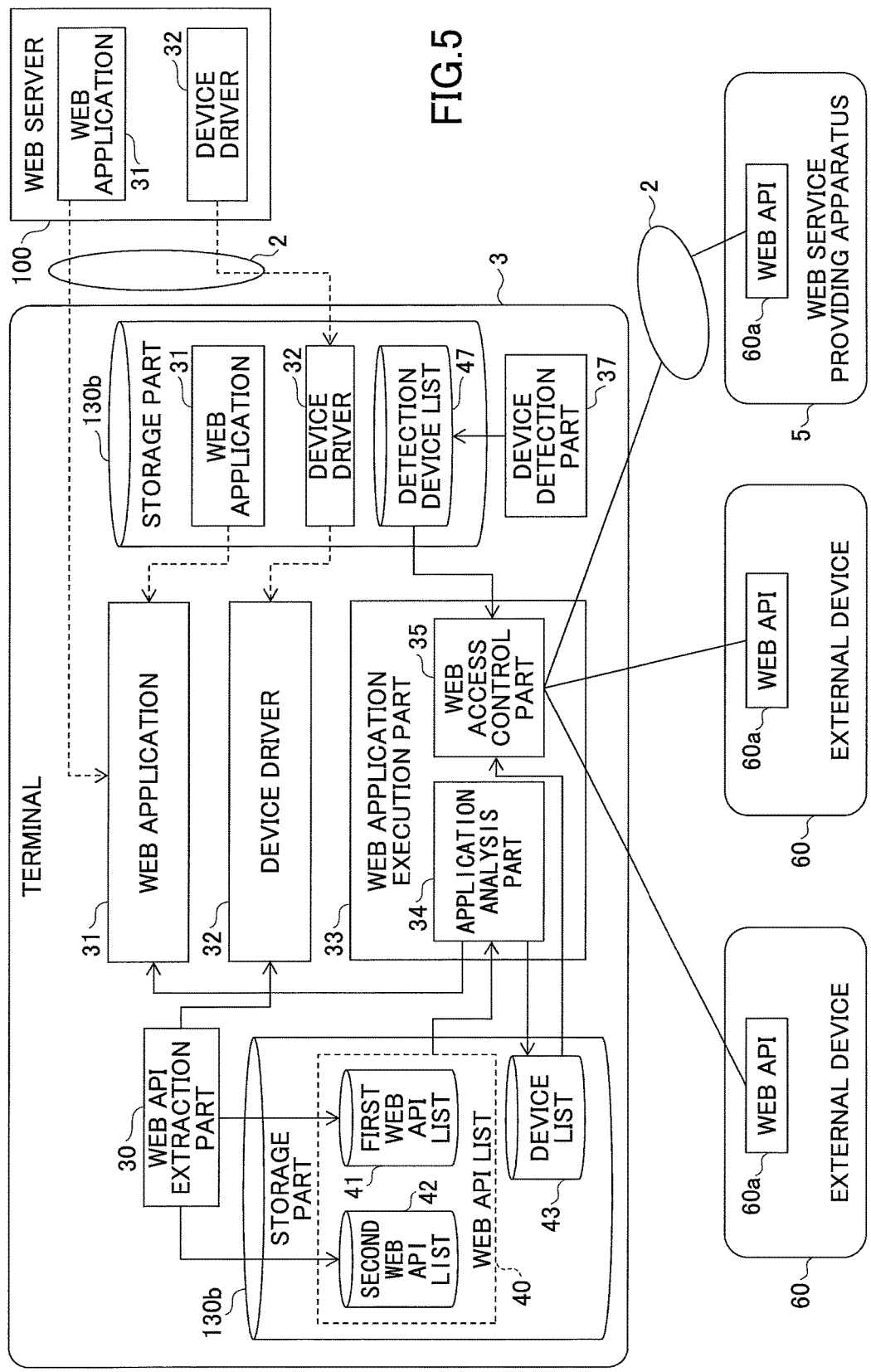
FIG. 5 is a diagram illustrating a functional configuration example of the terminal.

FIG. 5 is a diagram illustrating a functional configuration example of the terminal. In FIG. 5, the terminal 3 includes a Web API extraction part 30, a Web application 31, device drivers 32, and a Web application execution part 33. The storage part 130b stores the Web application 31, the device drivers 32, a first Web API list 41, a second Web API list 42, a device list 43, a detection device list 47, and the like.

The Web API extraction part 30 acquires a list of Web APIs available for the Web application 31 from the device drivers 32. The list of the Web APIs is stored as the Web API list 40 in the storage part 130b. The Web API list 40 includes a first Web API list 41 in which Web API names are extracted and the second Web API list 42 in which URLs are extracted, in order to specify the Web APIs.

The first Web API list 41 corresponds to a table in which device names of the external devices 60 are associated with respective Web APIs to access the external devices 60. The second Web API list 42 corresponds to a table in which the device names of the external devices 60 are associated with respective URLs to access the external devices 60.

The Web application 31 is read out from the storage part 130b where the Web application 31 has been stored, or is downloaded from a Web server 100, and is executed by the CPU 11b. The device drivers 32 are regarded as respective device drivers of the external devices 60, and are read out from the storage part 130b where the device drivers 32 have been stored, and are executed by the CPU 11b. The device driver 32 may be downloaded from the Web server 100 to the storage part 130b.

The Web application execution part 33 executes the Web application 31 and performs a process, when all multiple Web APIs are accessible in a mashup realizing one process function by accessing the multiple Web APIs. A browser or the like corresponds to the Web application execution part 33. The Web application execution part 33 includes an application analysis part 34, and a Web access control part 35.

The application analysis part 34 analyses the Web application 31, and estimates the external devices 60 used to execute the Web application 31. The device list 43, in which the external devices 60 estimated by the application analysis part 34 are associated for each of the Web applications 31, is stored in the storage part 130b.

The Web access control part 35 refers to the device list 43 and the detection device list 47, and controls the access of the Web application 31 to Web APIs 60a corresponding to the external devices 60.

A device detection part 37 detects the external devices 60 being currently available, from the terminal 3. The detection device list 47 indicates the device names of the detected external devices 60, and is stored in the storage part 130b. The detection device list 47 stored in the storage part 130b is referred to by the Web access control part 35.

The Web server 100 is regarded as a server that distributes programs such as the Web application 31, the device driver 32, and the like. When receiving a download request from the terminal 3 through the network 2, the Web server 100 downloads the program indicated by the download request to the terminal 3.

Hereinafter, in a case in which the terminal 3 uses two Web applications 31, various processes and data examples in the embodiment will be described below.

Figure 6:
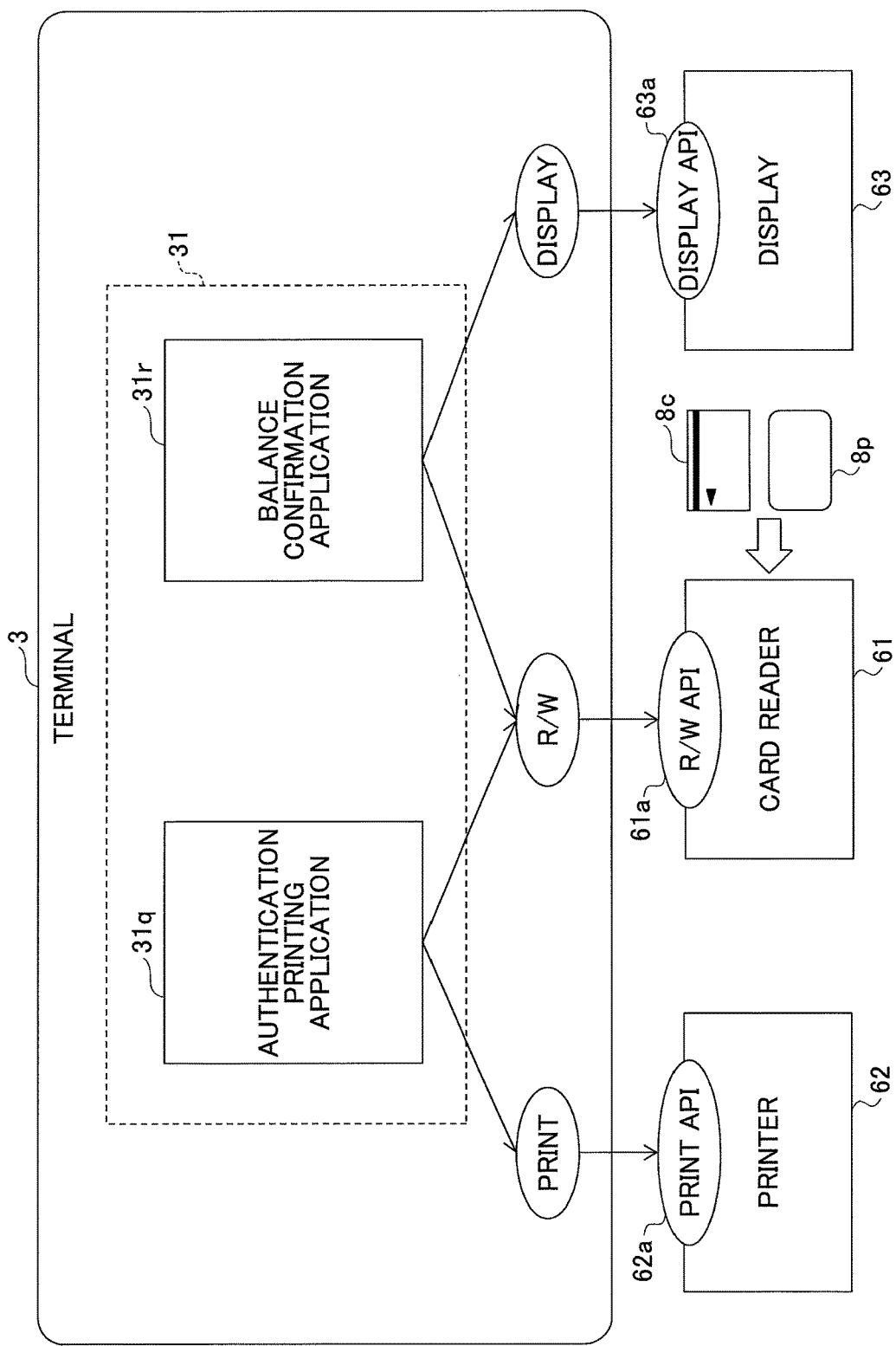
FIG. 6 is a diagram illustrating a configuration example of the Web service in which three external devices are used for two Web applications.

FIG. 6 is a diagram illustrating a configuration example of the Web service in which three external devices are used for two Web applications. In FIG. 6, the terminal 3 includes two Web applications 31: the authentication printing application 31q and a balance confirmation application 31r.

The card reader 61, the printer 62, and a display 63 correspond to the external devices 60. The card reader 61 includes the r/w API 61a, the printer 62 includes the print API 62a, and the display 63 includes a display API 63a.

The authentication printing application 31q conducts the user authentication based on the authentication information 8a of the IC card 8c which the card reader 61 reads out, and causes the printer 62 to perform the print process for printing a document or the like indicated by the user when the user authentication is successful.

The balance confirmation application 31r displays balance information of a pre-paid card 8p read out by the card reader 61.

In this example, the card reader 61 is used by two Web applications 31. Based on the example depicted in FIG. 6, the various processes and data examples will be described. First, a Web API extraction process conducted by the Web API extraction part 30 will be described.

Figure 7:
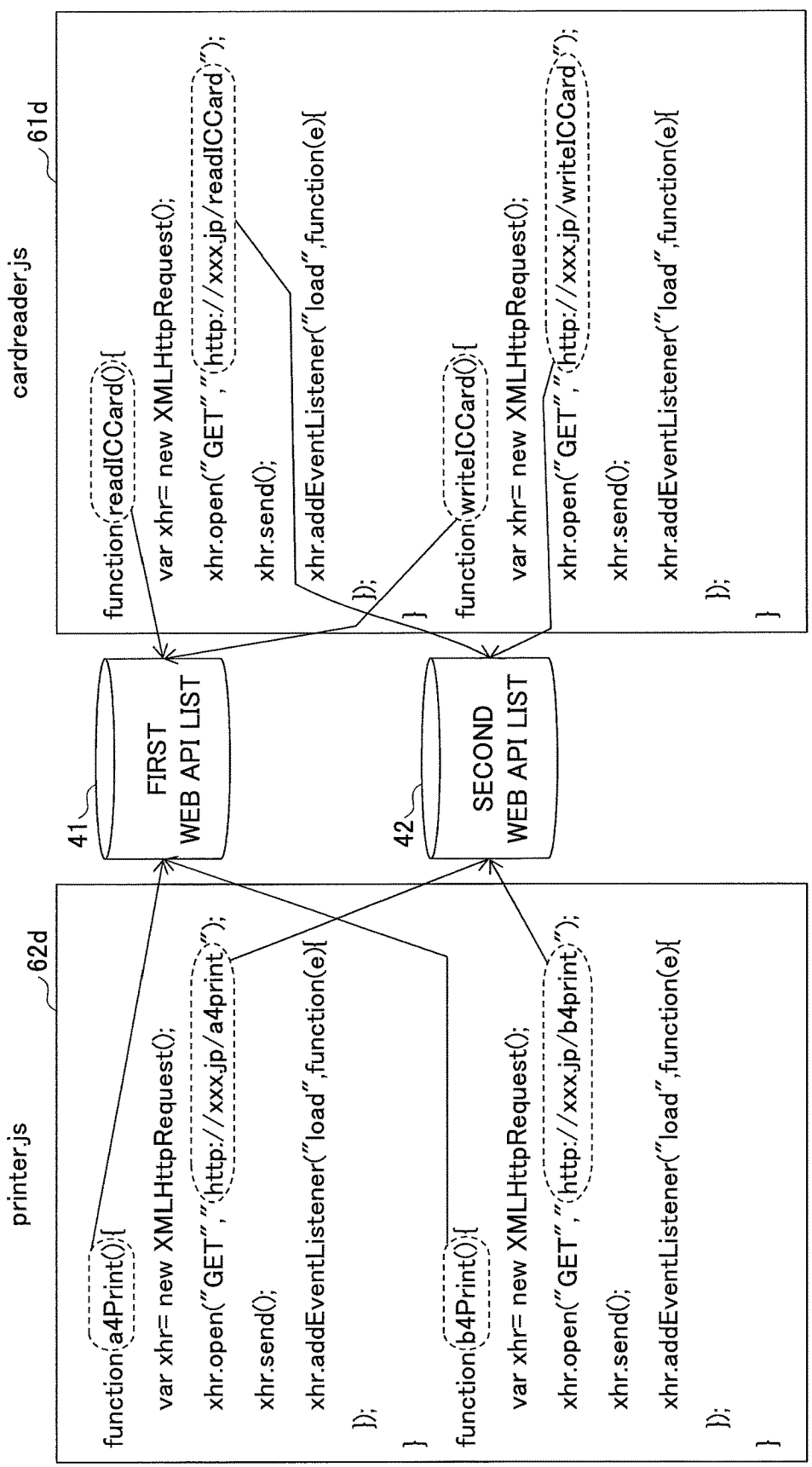
FIG. 7 is a diagram for explaining a Web API extraction process.

FIG. 7 is a diagram for explaining the Web API extraction process. In FIG. 7, description examples 61d and 62d of the device drivers 32 correspond to the card reader 61 and the printer 62, respectively. The description example 61d of the device driver 32 for the card reader 61 and the description example 62d of the device driver 32 for the printer 62 may be written in JavaScript (registered trademark).

In FIG. 7, the device driver 32 of the card reader 61 is depicted as a driver "cardreader.js", and the device driver 32 of the printer 62 is depicted as a driver "printer.js".

The Web API extraction part 30 acquires a function name and the URL of an access destination in a function specified by the function name from the driver "cardreader.js". All function names are recorded with the device name in the first Web API list 41. As the device name, "cardreader" corresponding to the driver "cardreader.js" is used.

Also, the Web API extraction part 30 stores the URLs of the access destinations in the function with the device name in the second Web API list 42.

In this example, function names "readICCard" and "writeICCard" are recorded with the device name "cardreader" in the first Web API list 41. URLs "http://xxx.jp/readICCard" and "http://xxx.jp/writeICCard" are recorded with the device name in the second Web API list 42.

As described above, similarly, from the device driver 32 of the printer 62, the Web API extraction part 30 acquires function names "a4Print" and "b4Print", and URLs "http://xxx.jp/a4print" and "http://xxx.jp/b4print". After that, the Web API extraction part 30 records the function names "a4Print" and "b4Print" with a device name "printer" in the first Web API list 41, and records the URLs "http://xxx.jp/a4print" and http://xxx.jp/b4print with the device name "printer" in the second Web API list 42.

In the same manner, the Web API extraction 30 acquires the function names and the URLs from the device driver 32 of the display 63, and records with the device name "display" of the display 63 in the first Web API list 41 and the second Web API list 42, respectively.

FIG. 8 is a diagram illustrating a data example of the first Web API list. In FIG. 8, the first Web API list 41 includes items of "DEVICE NAME", "WEB API", and the like. The item ""DEVICE NAME" indicates a name of the external device 60. The item "WEB API" indicates the name of the Web API 60a which the Web application 31 of the terminal 3 calls.

In the data example in FIG. 8, with respect to the printer 62 of the device name "printer", the Web APIs "a4Print" and "b4Print" are used. Also, with respect to the device name "cardreader" of the card reader 61, the Web APIs "readICCard" and "writeICCard" are used. Furthermore, with respect to the display 63 of the device name "display", "showDisplay" is used.

FIG. 9 is a diagram illustrating a data example of the second Web API list. In FIG. 9, the second Web API list 42 includes items of "DEVICE NAME", "URL", and the like. The item "DEVICE NAME" indicates a name of the external device 60. The item "URL" indicates the URL which the Web application 31 of the terminal 3 calls.

In the data example in FIG. 9, with respect to the printer 62 of the device name "printer", the URLs "http://xxx.jp/a4print" and "http://xxx.jp/b4print" are used. Also, with respect to the card reader 61 of the device name "cardreader", the URLs "http://yyy.jp/read_ic" and "http://yyy.jp/write_ic" are used. Furthermore, with respect to the display 63 of the device name "display", the URL "http://zzz.jp/show_disp" is used.

Next, an application analysis process conducted by the application analysis part 34 will be described. FIG. 10A and FIG. 10B are diagrams for explaining the application analysis process with respect to the authentication printing application. As an authentication function conducting the user authentication is one example, multiple Web APIs 60a called in the same function are mashed up and are realized as one process function. Two description examples will be depicted for this case.

In a description example 151 of an authPrint function depicted in FIG. 10A, the Web API "readICCard" is called by a description 152, and the Web API "a4Print" is called by a description 153. Since these two Web APIs are called, the application analysis part 34 refers to the first Web API list 41 in FIG. 8, and comprehends that two external devices "printer" and "cardreader" are used.

By analyzing the authPrint function, it is comprehended that the multiple external devices 60 are used to perform the series of processes. It is determined that one process function is provided by the printer 62 and the card reader 61. As described above, the application analysis part 34 regards the multiple Web APIs called in the same function as forming one process function.s In a description example 161 of the readCard function and the authPrint function in FIG. 10B, the readCard function is called by a description 162 in the authPrint function, and the Web API "readICCard" is called by a description 163 in the readCard function. Also, the Web API "a4Print" is called by a description 164. The application analysis part 34 refers to the first Web API list 41 in FIG. 8, and comprehends that two external devices "cardreader" and "cardreader" are used.

By analyzing the authPrint function, it is comprehended that the multiple external devices 60 are used to perform the series of processes. It is determined that one process function is provided by the printer 62 and the card reader 61. As described above, the application analysis part 34 searches for the Web APIs 60a by tracing into the deepest layer in a nesting structure in which one function calls another function, and regards the multiple Web APIs called in the nesting structure as forming one process function.

The description examples in FIG. 10A and FIG. 10B corresponds to case examples of the authentication printing application 31q that conducts the user authentication and then performs the print process by using the card reader 61 and the printer 62.

FIG. 11 is a diagram for explaining the application analysis process with respect to the balance confirmation application. In a description example 171 of a "checkCharge" function illustrated in FIG. 11, the Web API "readICCard" is called by a description 172. Also, the URL "http://zzz.jp/show_disp" is called by a description 173.

The application analysis part 34 comprehends, by referring to the first Web API list 41 in FIG. 8, that the external device "cardreader" is used. Also, the application analysis part 34 comprehends, by referring to the second Web API list 42 in FIG. 9, that the external device "cardreader" is used.

By analyzing the checkCharge function, it is comprehended that that the multiple external devices 60 are used to perform the series of processes. It is determined that one process function is provided by the printer 62 and the card reader 61. As described above, even if the access of the Web APIs 60a and a direct access of the URLs are mixed with each other, it is possible for the application analysis part 34 to specify the external devices 60.

FIG. 12 is a diagram illustrating a data example of a device list. In FIG. 12, the device list 43 is regarded as a table that indicates one or more external devices 60 as subjects of the access control for each of the Web applications 31, and includes items of "APPLICATION NAME", "DEVICE NAME 1", "DEVICE NAME 2", . . . , and the like.

The device list 43 is created by the application analysis part 34, and is referred to by the Web access control part 35 when conducting the access control from the Web application 31 to the external devices 60.

In the data example in FIG. 12, the application name "authPrint" corresponds to the authentication printing application 31q, and the application name "checkCharge" corresponds to the balance confirmation application 31r.

The device list 43 indicates that the external devices 60 accessed from the authentication printing application 31q are the printer 62 specified by a value "printer" in the item "DEVICE NAME 1" and the card reader 61 specified by a value "cardreader" in the item "DEVICE NAME 2".

Accordingly, in a case in which the authentication printing application 31q is executed and the access to one or more external devices 60 has not been completed, the Web access control part 35 suppresses the access to each of the external devices 60 including the external device 60 being successfully accessed. That is, all accesses to the printer 62 and the card reader 61 are suppressed.

Also, the device list 43 indicates that the external devices 60 accessed from the balance confirmation application 31r are the card reader 61 specified by a value "cardreader" in the item "DEVICE NAME 1" and the display 63 specified by a value "display" in the item "DEVICE NAME 2".

Accordingly, in a case in which the balance confirmation application 31r is executed and the access to one or more external devices 60 has not been completed, the Web access control part 35 suppresses the access to each of the external devices 60 including the external device 60 being successfully accessed. That is, all accesses to the card reader 61 and the display 63 are suppressed.

FIG. 13 is a diagram illustrating a data example of the detection device list. In FIG. 13, the detection device list 47 indicates the device names of the external devices 60 which are currently available. An item "DEVICE NAME" of the detection device list 47 indicates the device name for each of the external devices 60 which have been detected by the device detection part 37.

In the data example illustrated in FIG. 13, the device names "cardreader" and "display" alone are indicated, but the device name "printer" of the printer 62 does not exist in the detection device list 47. That is, it is not possible for the terminal 3 to access the printer 62.

The Web access control part 35 acquires the device names of the external devices 60 which are used in the process of the Web application 31, by referring to the device list 43. When the acquired device names are not listed in the detection device list 47, the Web application 31 is suppressed to access all external devices 50 specified by the acquired device names.

Figure 14:
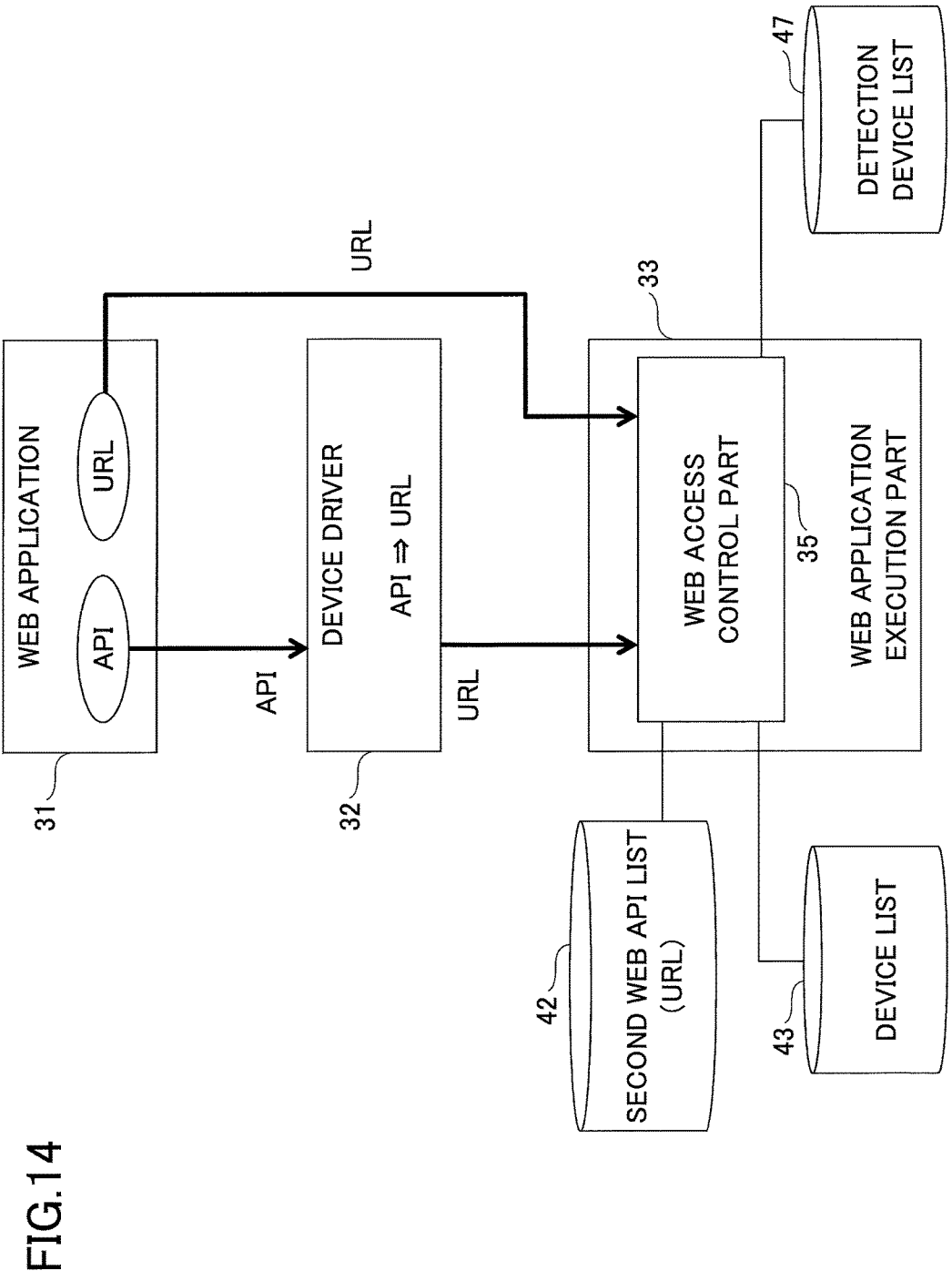
FIG. 14 is a diagram for explaining a determination method of permission or denial of the access.

Next, a determination method of permission or denial of the access by the Web access control part 35 will be described. FIG. 14 is a diagram for explaining the determination method of the permission or denial of the access. In FIG. 14, there are two methods, called a first method and a second method below, for the Web application 31 to access the external devices 60. In the first method, the Web application 31 accesses the external devices 60 by using the API 60a provided by the device driver 32. In the second method, the Web application 31 directly accesses the URL of the external device 60.

The Web application 31 is regarded as the authentication printing application 31q, and may be represented by the description example 151 illustrated in FIG. 10A.

In the first method, the device driver 32 converts the Web API 60a called by the Web application 31 into the URL, and requests the Web access control part 35 to access the converted URL.

When the readICCard function is the Web API 60a which the Web application 31 called, the device driver 32 sends the access request to the Web access control part 35 to access the URL "Web access control part 35".

The Web access control part 35 refers to the second Web API list 42 in response to the access request from the device driver 32, and acquires the device name "cardreader" corresponding to the URL "http://yyy.jp/read_ic" which is requested from the device driver 32 to access.

Furthermore, the Web access control part 35 acquires the device name corresponding to the Web application 31 which is a calling originator, by referring to the device list 43. In a case of the authentication printing application 31q, the device names "printer" and "cardreader" are acquired.

When either one of or all device names "printer" and "cardreader" acquired from the device list 43 are not listed in the detection device list 47, in the Web access control part 35, the access to the URL "http://yyy.jp/read_ic" from the device driver 32 is not conducted. The access request is suppressed.

On the other hand, all device names "printer" and "cardreader" are listed in the detection device list 47, the Web access control part 35 accesses the URL "http://yyy.jp/read_ic" indicated by the access request.

Next, in the second method, the Web access control part 35 receives a direct access request to the URL "http://yyy.jp/read_ic" from the Web application 31. In this case, the Web access control part 35 acquires the device name "cardreader" corresponding to the URL "http://yyy.jp/read_ic" by referring to the second Web API list 42.

The Web access control part 35 acquires all device names "printer" and "cardreader" corresponding to the application name "authPrint" of the authentication printing application 31q being the request originator from the device list 43.

Then, when either one of or all device names "printer" and "cardreader" acquired from the device list 43 are not listed in the detection device list 47, the access from the device driver 32 to the URL "http://yyy.jp/read_ic" is not conducted. The access request is suppressed.

On the other hand, when all device names "printer" and "cardreader" are listed in the detection device list 47, the Web access control part 35 accesses the URL "http://yyy.jp/read_ic" indicated in the access request.

Figure 15B:
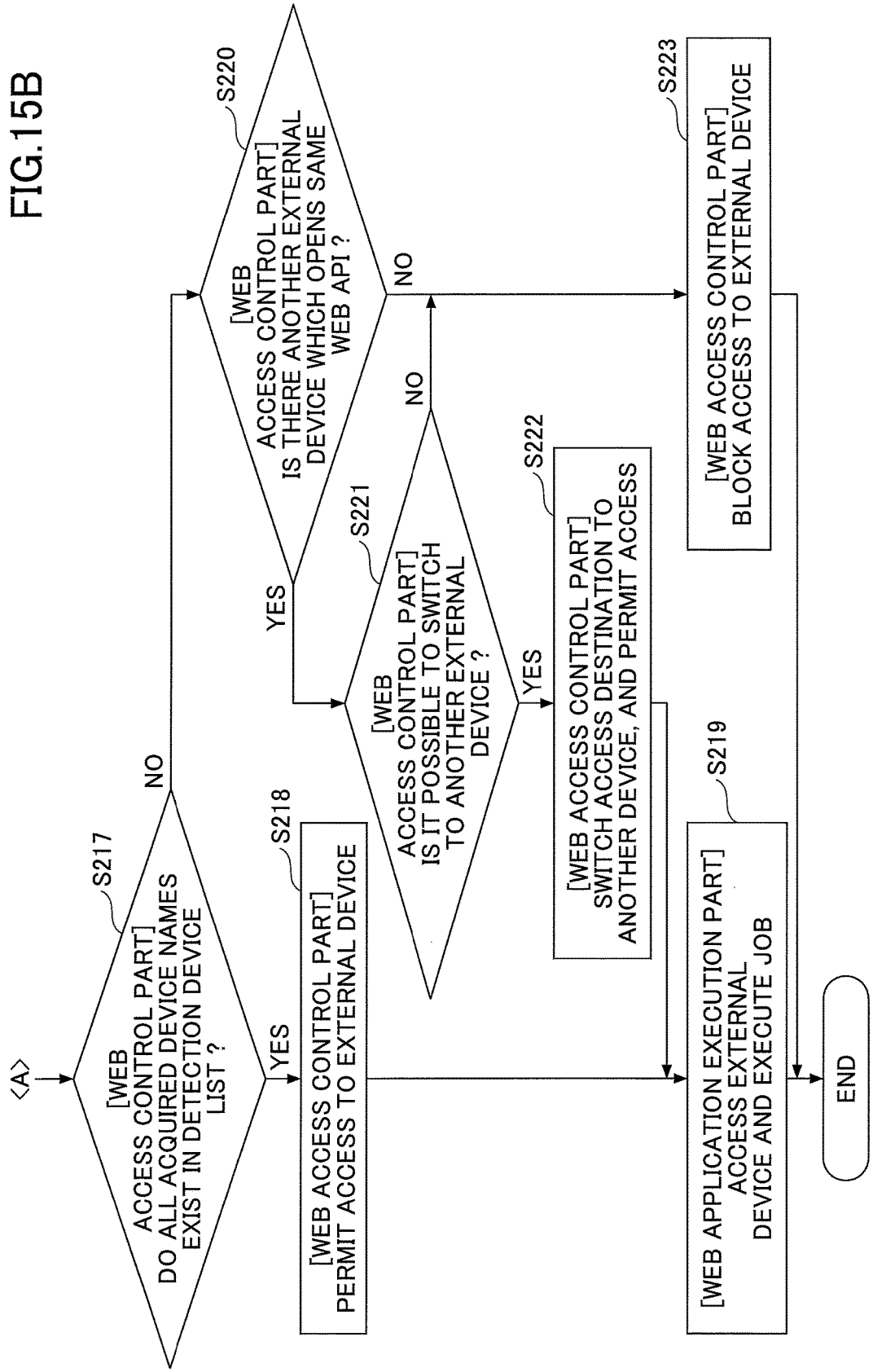

Next, the entire access control process conducted by the terminal 3 in the embodiment will be described. FIG. 15A and FIG. 15B are diagrams for explaining the entire access control process in the embodiment. In FIG. 15A, the device detection part 37 finds the external devices 60 accessible through the communication I/F 17b (step S211). The Web application 31 and the device driver 32 corresponding to the external devices 60 found in step S211 are downloaded from the Web server 100 or the like.

When downloading of a new device driver 32 is detected, the Web API extraction part 30 analyzes the device driver 32 being downloaded, and creates the Web API list 40 (step S212). The first Web API list 41 and the second Web API list 42 are created and stored in the storage part 130b. When there is no downloading of the new device driver 32, step S212 is omitted.

Next, when the application analysis part 34 detects the download of the new Web application 31, it analyzes the Web application 31 being downloaded, and adds a list of the external devices 60 used in a process related to the Web application 31 in the device list 43 (step S213). When there is no download of the new Web application 31, step S213 is omitted.

The Web application execution part 33 activates the Web application 31, and receives the access request from the Web application 31 to access the external devices 60 (step S214).

The application analysis part 34 acquires the URL indicated by the access request, and obtains the device name from the acquired URL (step S215). Also, the application analysis part 34 acquires the device names of the external devices 60 which the Web application 31 uses, from the device list 43 (step S216).

After that, referring to FIG. 15B, the application analysis part 34 determines whether all device names acquired in step S216 exist in the detection device list 47 (step S217). When all device names exist (Yes of step S217), the application analysis part 34 permits the accesses to the external devices 60 (step S218). Accordingly, the Web application execution part 33 executes respective jobs by accessing the external devices 60 (step S219). After that, the access control process is terminated.

On the other hand, when a part of or all device names acquired in step S215 do not exist in the detection device list 47 (No of step S217), the Web access control part 35 determines whether another external device 60 opening the same Web API 60a exists (step S220).

When it is determined that there is another external device 60 (Yes of step S220), the Web access control part 35 further determines whether it is possible to switch to another external device 60 (step S221). As an example of the determination method, a confirmation screen G81 as depicted in FIG. 17 is displayed at the user I/F 16b, and conducts a process corresponding to an instruction (YES to continue or NO to cancel) of the user received from the user I/F 16b.

When the instruction of the user indicates YES to continue (YES of step S221), it is determined that a switch to another external device 60 is permitted, and the Web access control part 35 switches the access destination to another external device 60 and permits the access (step S222). By this access permission, the Web application execution part 33 accesses the external devices 60 including another external device 60 and executes the job (step S219). After that, the access control process is terminated.

On the other hand, when another external device 60 does not exist (NO of step S220), or the user indicates NO to cancel (NO of step S221), the Web access control part 35 blocks the accesses to all requested external devices 60 (step S223). After that, the access control process is terminated.

Figure 16:
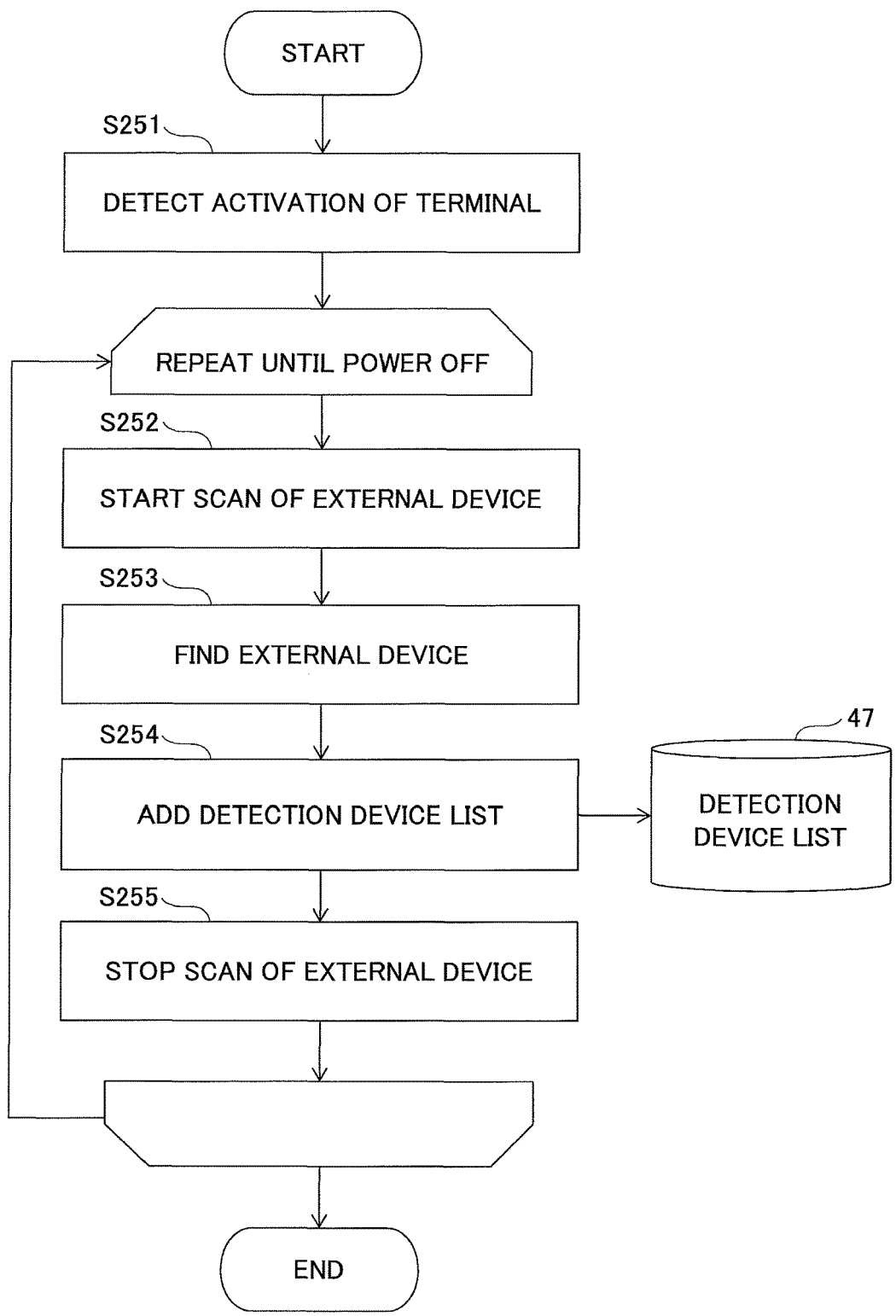
FIG. 16 is a flowchart for explaining a device detection process conducted by a device detection part.

FIG. 16 is a flowchart for explaining the device detection process conducted by the device detection part. In FIG. 16, the device detection part 37 detects an activation of the terminal 3 in response to power ON of the terminal 3 (step S251). The device detection part 37 repeats processes from steps S252 to S255 at predetermined intervals until the power of the terminal 3 is OFF.

The device detection part 37 starts a scan of the external devices 60 (step S252), and finds the external devices 60 (step S253). When the device detection part 37 finds the new external device 60, the device detection part 37 adds it to the detection device list 47 (step S254), and stops the scan of the external devices 60 (step S255). The device detection part 37 repeats the above described processes from step S252 in the same manner.

FIG. 17 is a diagram illustrating an example of the confirmation screen. In FIG. 17, the confirmation screen G81 includes a message display area 81a, a YES button 81b, and a NO button 81c. In the message display area 81a, a message is displayed to confirm whether the user permits to switch the external device 60. The message to be displayed may be "By switching a device xxx to a device yyy, it is possible to continue an execution. Please select YES to continue, or NO to cancel." or the like The YES button 81b corresponds to a button selected by the user when the user permits switching to the external device 60 and executes the Web application 31. In response to a selection of the YES button 81b the Web access control part 35 switches the access destination to another external device 60 and permits the requested access (step S222 in FIG. 15B). The execution of the Web application 31 is continued.

The NO button 81c corresponds to a button selected by the user when the user does not permit the switching of the external device 60. In response to a selection of the NO button 81c, the Web access control part 35 blocks the accesses to all external devices 60 indicated in the access request (step S223 in FIG. 15). The execution of the Web application 31 is blocked.

Also, in step S223 in FIG. 15, when the accesses to all external devices 60 are blocked, a notification screen G82 as illustrated in FIG. 18 may be displayed at the user I/F 16b.

FIG. 18 is a diagram illustrating an example of the notification screen. The notification screen G82 in FIG. 18 includes a message display area 82a and an OK button 82b. A message is displayed in the message display area 82a to report to the user that the execution of the process by the Web application 31 is interrupted. The message to be displayed may be "The execution is interrupted, since the device xxx is not found. Please confirm a state of the device xxx to resume the execution" or the like.

The OK button 82b corresponds to a button selected when the user has confirmed the interruption of the execution. In response to the selection of the OK button 82b, the access control process in the embodiment is terminated.

Figure 19B:
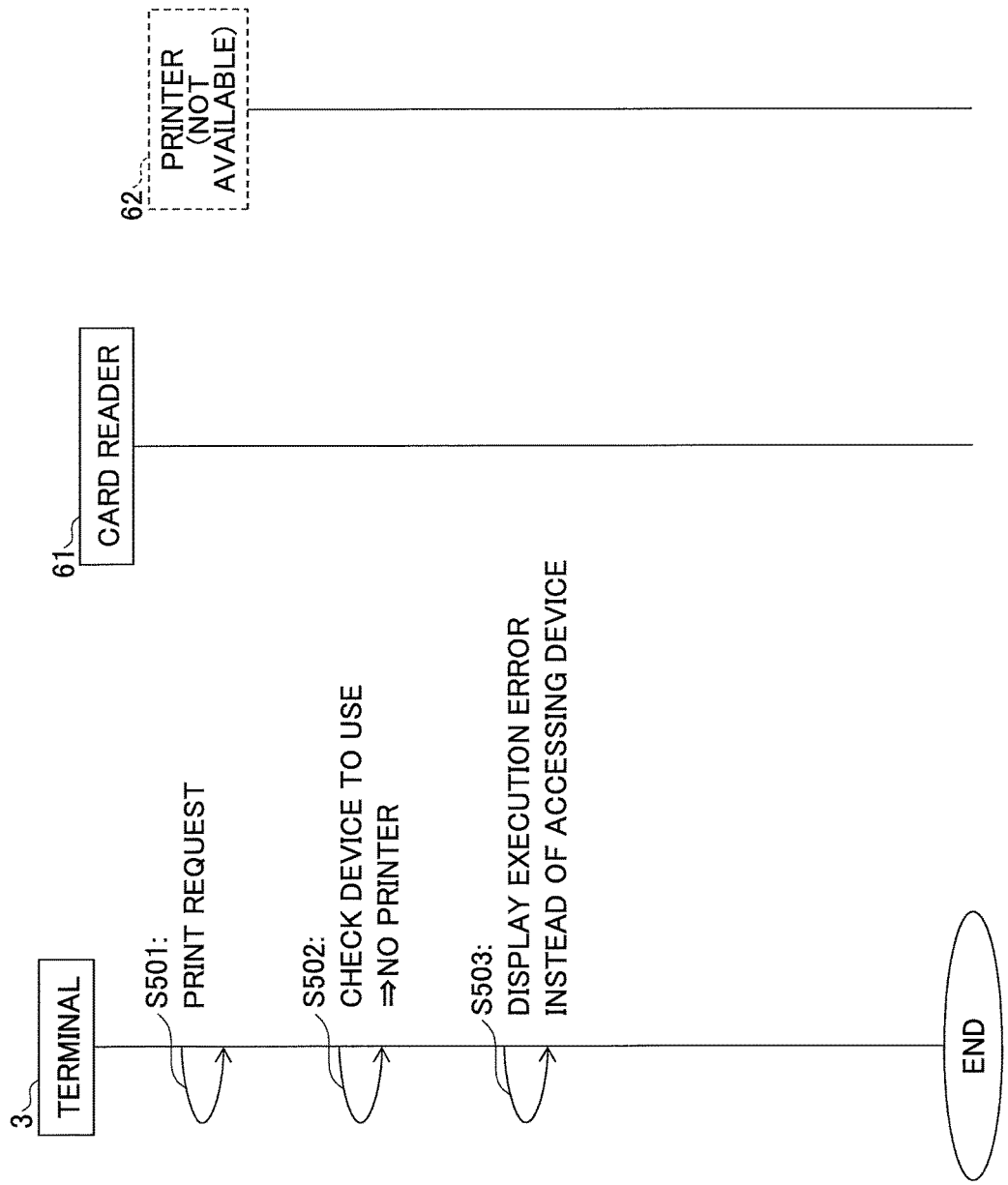

Next, a difference between process sequences of the embodiment in which the access control process is performed and another case in which the access control process is not performed will be described. FIG. 19A and FIG. 19B are diagram for explaining a difference between the process sequences between presence and absence of the access control process according to the embodiment. In FIG. 19A and FIG. 19B, the execution of the authentication printing application 31q is exemplified, and the difference between the process sequences.

FIG. 19A illustrates the process sequence in the case in which the access control process according to the embodiment is not conducted. In FIG. 19A, a terminal 3' corresponds to a terminal which does not perform the access control process according to the embodiment. The access control process is not implemented in the terminal 3'. The terminal 3' receives the print request from the authentication printing application 31q (step S401), and sends an authentication information read-out request for reading out the authentication information 8a to the card reader 61 (step S402).

The card reader 61 reads out the authentication information 8a from the IC card 8c in response to the authentication information read-out request (step s403), and sends an authentication information response to the terminal 3' (step S404). At the terminal 3', when the authentication information response is received, the authentication information 8a read out from the IC card 8c is reported to the authentication printing application 31q.

The authentication printing application 31q retains the authentication information 8a of the IC card 8c in the terminal 3' (step S405). The authentication printing application 31q conducts the user authentication by comparing the authentication information 8t acquired from a storage part of the terminal 3' with the authentication 8a acquired from the IC card 8c (step S406). When the user authentication is successfully completed, the authentication printing application 31q sends the print request to the printer 62 (step S407).

However, when the terminal 3' is in a state in which the printer 62 is not accessible for the terminal 3', a communication connection is not established between the terminal 3' and the printer 62. Hence, the printer 62 is not found. When a time out has occurred while waiting for a response with respect to the print request, the terminal 3' displays an execution error at the user I/F 16b (step S408). The authentication print process by the authentication printing application 31q is terminated.

As described above, in the process sequence depicted in FIG. 19A, the printer 62 is not found, and the print process is not performed by the printer 62. Regardless of this result, from step S405, the authentication printing application 31q has been retaining the authentication information acquired from the IC card 8c.

As a result, there may be a security problem in which the authentication information 8a is unnecessarily transmitted to a cloud computing system and the external device 60. Also, even in a state in which the printer 62 is not available, only to acquire the authentication information 8a of the IC card 8c, the authentication printing application 31q is intentionally used.

Moreover, even if the user authentication is successfully completed, accesses repeatedly conducted in step S407 as the print request or the like to the printer 62, which is not available, are regarded as unnecessary accesses which merely consume resources of the terminal 3'.

FIG. 19B illustrates an example of the process sequence in the case in which the access control process according to the embodiment is conducted. In FIG. 19B, at the terminal 3, in response to the print request from the authentication printing application 31q (step S501), the Web access control part 35 checks, by using the device list 43 and the detection device list 47, whether all external devices 60 to use exist (step S502). The terminal 3 detects that the printer 62 does not exist inside itself.

The Web access control part 35 displays an execution error at the user I/F 16b, instead of accessing the card reader 61 (step S503). As display examples of the execution error, the confirmation screen G81 in FIG. 17 and/or the notification screen G82 in FIG. 18 are displayed.

In the process sequence in FIG. 19B, regardless of an existence of the card reader 61, the authentication information 8a is not acquired. Accordingly, the authentication information 8a is not unnecessarily retained by the Web application 31. Thus, it is possible to improve the security related to the accesses to the external devices 60. Also, since there is no access to the printer 62 which does not exist (is not detected), compared with the process sequence in FIG. 19A, it is possible to prevent wasting the resources of the terminal 3.

It is possible to improve security of accessing the external device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mashup method for realizing a process function by accessing multiple Web Application Programming Interfaces, comprising:

specifying, by a computer, Web Application Programming Interfaces which a first Web application uses, by analyzing descriptions of drivers used to access the multiple Web Application Programming Interfaces from the first Web application to a first external device for acquiring and sending authentication information to the first Web application and a second external device for conducting a predetermined process based on the authentication information;

creating and storing, by the computer, a Web Application Programming Interface list which indicates the Web Application Programming Interfaces and a further Web Application Programming Interface used to access a third external device other than the second external device in a storage part;

analyzing, by the computer, the first Web application and estimating the first external device and the second external device including the Web Application Programming Interfaces which the first Web application accesses;

creating and storing, by the computer, an external device list which indicates the estimated first and second external devices, and the third external device, which is estimated by analyzing a second Web application using the first external device and the third external device in the storage part;

restricting, by the computer, an access to each of the Web Application Programming Interfaces pertinent to the first Web application by referring to the external device list, when at least the second external device does not exist, the first and second external devices including the Web Application Programming Interfaces of the first external device and the second external device used in a first process of the first Web application, the first process realized by mashup;

permitting, by the computer, an access to the Web Application Programming Interfaces of the first external device and the second external device pertinent to the first Web application, when the first external device and the second external device including the Web Application Programming Interfaces used in the first process of the first Web application, the first process realized by mashup, refers to the external device list; and restricting, by the computer, both the Web Application Programming Interfaces of the first external device and the third external device pertinent to the second Web application, when the first external device and the third external device including the Web Application Programming Interfaces used in a second process of the second Web application, the second process realized by mashup, refers to the external device list.

2. The mashup method as claimed in claim 1, wherein the restricting of the access includes permitting the access to each of the Web Application Programming Interfaces used by the first Web application when the first and second external devices used by the first Web application do not exist in the detection device list.

3. The mashup method as claimed in claim 1, wherein the Web Application Programming Interface list includes a first Web Application Programming Interface list and a second Web Application Programming Interface list, and the creation of the Web Application Programming Interface list further includes creating the first Web Application Programming Interface list by associating with device names of the first and second external devices by specifying functions for calling the Web Application Program Interfaces from the descriptions of the drivers; and creating the second Web Application Programming Interface list by associating with URLs for calling the Web Application Program Interfaces with the device names.

4. The mashup method as claimed in claim 1, wherein the creating of the external device list further includes estimating first and second external devices corresponding to the multiple Web Application Programming Interfaces in a same function in a description of the first Web application as the first and second external devices used for the execution of the first Web application.

5. The mashup method as claimed in claim 4, wherein the creating of the external device list creates the external device list by associating an application name of the first Web application with the estimated first and second external devices for each of the Web applications.

6. The mashup method as claimed in claim 1, wherein the restricting of the access further includes determining whether another external device opening the same Web Application Programming Interface exists, when at least one of the first and second external devices used by the first Web application does not exist, displaying, at a user interface, a confirmation screen for confirming to switch to the other external device, when the other external device exists, and permitting the access to the other external device, when information indicating that the switch to the other external device is received from the user interface.

7. The mashup method as claimed in claim 5, wherein the restricting of the access further includes blocking the access to the first and second external devices until each of the first and second external devices used by the first Web application becomes available, when the other external device does not exist.

8. A non-transitory computer-readable recording medium that stores a program that causes a computer to execute a mashup process for realizing a process function by accessing multiple Web Application Programming Interfaces, comprising:

specifying Web Application Programming Interfaces which a first Web application uses, by analyzing descriptions of drivers used to access the multiple Web Application Programming Interfaces from the first Web application to a first external device for acquiring and sending authentication information to the first Web application and a second external device for conducting a predetermined process based on the authentication information;

creating and storing a Web Application Programming Interface list which indicates the Web Application Programming Interfaces and a further Web Application Programming Interface used to access a third external device other than the second external device in a storage part;

analyzing the first Web application and estimating the first external device and the second external device including the Web Application Programming Interfaces which the first Web application accesses;

creating and storing an external device list which indicates the estimated first and second external devices, and the third external device, which is estimated by analyzing a second Web application using the first external device and the third external device in the storage part;

restricting an access to each of the Web Application Programming Interfaces pertinent to the first Web application by referring to the external device list, when at least the second external device does not exist, the first and second external devices including the Web Application Programming Interfaces of the first external device and the second external device used in a first process of the first Web application, the first process realized by mashup;

permitting an access to the Web Application Programming Interfaces of the first external device and the second external device pertinent to the first Web application, when the first external device and the second external device including the Web Application Programming Interfaces used in the first process of the first Web application, the first process realized by mashup, refers to the external device list; and restricting both the Web Application Programming Interfaces of the first external device and the third external device pertinent to the second Web application, when the first external device and the third external device including the Web Application Programming Interfaces used in a second process of the second Web application, the second process realized by mashup, refers to the external device list.

9. A terminal comprising:

a computer that executes a mashup process for realizing a process function by accessing multiple Web Application Programming Interfaces, the mashup process including specifying Web Application Programming Interfaces which a first Web application uses, by analyzing descriptions of drivers used to access the multiple Web Application Programming Interfaces from the first Web application to a first external device for acquiring and sending authentication information to the first Web application and a second external device for conducting a predetermined process based on the authentication information;

creating and storing a Web Application Programming Interface list which indicates the Web Application Programming Interfaces and a further Web Application Programming Interface used to access a third external device other than the second external device in a storage part;

analyzing the first Web application and estimating the first external device and the second external device including the first Web Application Programming Interfaces which the first Web application accesses;

creating and storing an external device list which indicates the estimated first and second external devices, and the third external device, which is estimated by analyzing a second Web application using the first external device and the third external device in the storage part;

restricting an access to each of the Web Application Programming Interfaces pertinent to the first Web application by referring to the external device list, when at least the second external device does not exist, the first and second external devices including the Web Application Programming Interfaces used in a process of the Web Application Programming Interfaces of the first external device and the second external device used in a first process of the first Web application, the first process realized by mashup;

permitting an access to the Web Application Programming Interfaces of the first external device and the second external device pertinent to the first Web application, when the first external device and the second external device including the Web Application Programming Interfaces used in the first process of the first Web application, the first process realized by mashup, refers to the external device list; and restricting both the Web Application Programming Interfaces of the first external device and the third external device pertinent to the second Web application, when the first external device and the third external device including the Web Application Programming Interfaces used in a second process of the second Web application, the second process realized by mashup, refers to the external device list.

* * * * *